United States Patent [19]
Kunze

[11] Patent Number: 5,502,282
[45] Date of Patent: Mar. 26, 1996

[54] SLEEVE HEAD FOR A CABLE SLEEVE HAVING A SEAL INSERT COMPOSED OF ELASTIC MATERIAL

[75] Inventor: Dieter Kunze, Neuried, Germany

[73] Assignee: Siemens Aktiengesellschaft, Munich, Germany

[21] Appl. No.: 257,097

[22] Filed: Jun. 7, 1994

[30] Foreign Application Priority Data

Aug. 11, 1993 [DE] Germany ............... 43 26 972.9

[51] Int. Cl.$^6$ ............................................. H02G 15/04
[52] U.S. Cl. ............................................. 174/93; 174/77 R
[58] Field of Search ............................ 174/91, 92, 93, 174/77 R

[56] References Cited

U.S. PATENT DOCUMENTS

| | | | |
|---|---|---|---|
| 2,688,651 | 9/1954 | Blake | 174/93 |
| 2,996,567 | 8/1961 | Channell et al. | 174/92 |
| 3,254,153 | 5/1966 | Kohler | 174/93 |
| 3,655,907 | 4/1972 | Philibert et al. | 174/77 R |
| 4,103,911 | 8/1978 | Giebel et al. | 174/77 R |
| 4,255,614 | 3/1981 | Channell | 174/93 |
| 5,007,701 | 4/1991 | Roberts | 174/77 R |
| 5,313,019 | 5/1994 | Brusselmans et al. | 174/93 |

FOREIGN PATENT DOCUMENTS

| | | |
|---|---|---|
| 0309895 | 4/1989 | European Pat. Off. . |
| 0402653 | 12/1990 | European Pat. Off. . |
| 2309649 | 8/1974 | Germany . |
| 2427677 | 12/1975 | Germany . |
| 3129489 | 2/1983 | Germany ............... 174/93 |
| 7806052 | 12/1979 | Netherlands ........... 174/77 R |
| 780993 | 8/1957 | United Kingdom ........... 174/77 R |
| WO92/22113 | 12/1992 | WIPO . |

*Primary Examiner*—Morris H. Nimmo
*Attorney, Agent, or Firm*—Hill, Steadman & Simpson

[57] ABSTRACT

A sleeve head for a cable sleeve having a seal insert of elastic material and having pressure-producing elements, preferably screws for compressing the seal insert. The cable sleeve is conically expanded in the introduction region into which an initially adapted, conical seal insert is introduced. After introduction of the cables, pressure is generated on the seal insert in axial direction with the pressure-producing elements. As a consequence of the conical fashioning at the circumference of the cable sleeve, a radial compression of the elastic material of the seal insert ensues, and a sealing ensues as a result thereof. Cable clamp devices aligned with the cable introduction openings are provided in the inside of the cable sleeve.

23 Claims, 4 Drawing Sheets

SLEEVE HEAD FOR A CABLE SLEEVE HAVING A SEAL INSERT COMPOSED OF ELASTIC MATERIAL

BACKGROUND OF THE INVENTION

The invention is directed to a sleeve head for a cable sleeve having a seal insert of elastic material and having pressure-producing elements for compressing the seal insert.

German Published Application 24 27 677 discloses a sleeve head having a plurality of cable introductions divided in longitudinal direction, whereby these cable introduction openings must be cut out as needed. A tape-shaped plastic sealing material is introduced as sealant. The division of the sleeve head ensues with parallel parting planes such that a plurality of seal member segments are formed wherein a relatively limited number of cables can then be introduced.

European Patent Application 0 402 653-A2 discloses cable introduction seals of shapeable material in the form of an annular plug composed of an expanded elastomer that is introduced into a cable introduction opening in the form of a cylindrical sleeve of a housing. The shaping of such seals ensues in the fashion of the simple and known stuffing box principle.

SUMMARY OF THE INVENTION

It is then an object of the invention to create a sleeve head wherein as many cable introductions as possible are present, whereby the seal should be especially simple to assemble and install to conform the elastic material. The object is achieved with a sleeve head for a cable sleeve having a seal insert of elastic material with pressure-producing elements for compressing the seal insert in that the cable sleeve is conically expanded to the end, in the introduction region; in that a conical seal insert adapted in size and shape to the introduction region is arranged between two pressure plates; in that the seal insert comprises conically converging cable introduction openings; and in that the seal insert can be compressed and shaped by the pressure plates using pressure-producing elements such that a sealing pressing against the introduced cables ensues due to the deformation of the insert in the cable introductions.

According to the invention, a sleeve head and a cable sleeve are arranged such that the closing and sealing of the cable sleeve in the region of the sleeve head can ensue simultaneously for all cable introduction openings with a single seal insert of elastic material which is advantageous over the prior art. As a result of the conical fashioning of the cable sleeve at its end and as a result of the likewise conical fashioning of the seal insert at the outside circumference, advantageous conditions derive with respect to the required compression pressure for creating the seal in the cable introduction openings.

It is thereby immaterial whether a through-sleeve or a pot sleeve is involved. An axial pressing of the seal insert composed of resilient material ensues due to the arrangement of the pressure-producing elements that act on the seal insert. The cable introduction openings themselves are likewise conically fashioned, so that a broad range of cable diameters can be covered. It is also expedient to arrange the cable introduction openings such that they can each be respectively provided with a slot proceeding radially toward the outer circumference of the seal insert. It becomes possible in this way that the cables can be introduced into the cable introduction openings of the seal insert proceeding from the outside, so that uncut cables can also be utilized.

The seal insert composed of resilient material is fashioned as a block and is introduced between two pressure plates in the sealing region of the cable sleeve, whereby the compression arises essentially from the outside as a consequence of the conical fashioning of the sleeve end when the seal insert is axially pressed in by the pressure-producing elements. The slots for the insertion of the cables are radially arranged and are thus directly exposed to the compressive effect by the outside cone. The relatively thick sealing insert compensates for compression pressure variation within the volume.

Given a normal (non-conical) stuffing box end seal, a compression pressure of only:

$$p = \frac{F}{\frac{D1^2 \pi}{4}}$$

arises given axial pressing of a seal block between two plates (F =pressing force, D1=diameter of the plate).

Given the same force, the solution of the invention produces a far higher compression pressure of:

$$p = \frac{F}{(D1^2 - D2^2)\frac{\pi}{4}}$$

(D1=diameter of the outer pressure plate, D2=diameter of the inner pressure plate).

A great advantage over previous seals according to the stuffing box principle may likewise be seen therefrom.

The thickness of the seal insert is approximately twice as great as the diameter difference of the maximum and minimum cable diameters that can be introduced into a cable introduction and the spacing of the cable introductions from one another should amount to at least 1.3 times the greatest introducible cable diameter.

It is also a subject matter of the invention that cable clamp devices are already installed in the inside of the cable sleeve at the cable introduction openings, these cable clamp devices being expediently arranged directly at the inner pressure plate, so that each introduced cable can be seized directly at the end of the cable introduction. Various modifications are proposed for this purpose, whereby a contacting of a cable shielding can also ensue.

The invention shall now be set forth in greater detail with reference to nine figures.

DETAILED DESCRIPTION OF THE PREFERRED EMBODIMENTS

Figure 1:
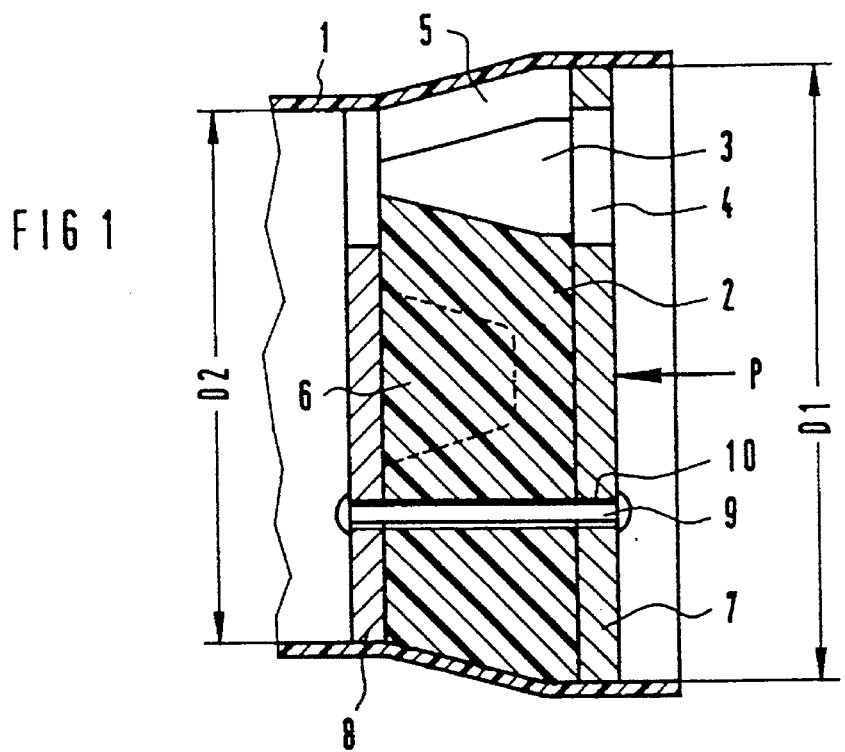
FIG. 1 is a schematic cross section taken generally along I—I of FIG. 2 of the introduction seal of the invention.

FIG. 1 shows the basic fashioning of a cable introduction with a sleeve head in which a plurality of cable introduction openings are arranged. It becomes clear therefrom that the cable sleeve 1 comprises a conical, outwardly expanding opening in the region of the sleeve head that is composed of two pressure plates 7 and 8 and of an elastic seal insert 2 lying therebetween. The sleeve head that is likewise conical overall is introduced into this conical opening of the sleeve, whereby the inner pressure plate 8 is connected at a fixed distance to the outer pressure plate 7, for example with clinch bolts 9. After the insertion of the cables during assembly of the sleeve head, this is pressed inward with the assistance of pressure-producing elements, for example screws, that generate a force in the direction P and produces a compression pressure within the elastic material. The outer region of the cable sleeve 1 thus initially proceeds cylindrically with the diameter D1 to such an extent that the outer pressure plate 7 can move axially until the maximum compression pressure has been reached. It is also indicated that one or more filling pieces 6 or cavities as well can be worked in inside the seal insert 2, as a result whereof sealant can be saved on the one hand and, on the other hand, the elastic behavior with respect to the hardness of the block can be influenced. It may also be seen that the generated lines of the cones of the cable introduction openings 13 and of the seal member insert 2 proceed parallel.

Figure 2:
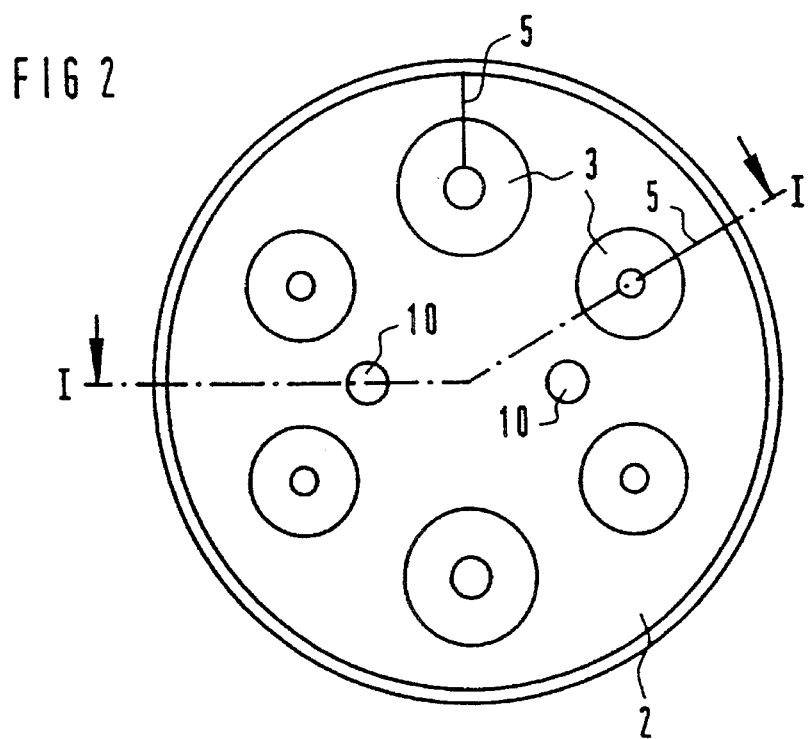
FIG. 2 is a right side view of the seal insert of FIG. 1 as viewed from the exterior of the cable sleeve with a pressure plate removed for clarity.

FIG. 2 shows the seal insert 2 of FIG. 1 in a right side view proceeding from the outside (but without pressure plate), so that the conical fashionings of the cable introduction openings 3 are visible. Here, the conical cable introduction openings 3 are circularly arranged close to an outer limitation of the seal insert, so that radial slots 5 for the introduction of the cables, particularly for uncut cables, can be conducted to the edge of the seal insert 2. The bores 10 for conducting the connector elements between the pressure plates may also be seen.

Figure 3:
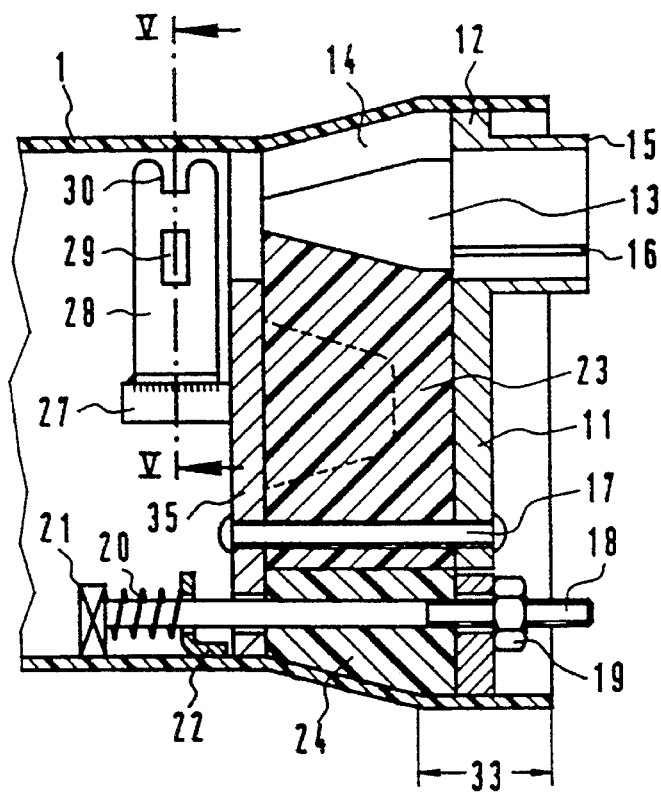
FIG. 3 is a cross section taken generally along III—III of FIG. 4 of an annularly divided embodiment.

FIG. 3 shows a sleeve head having a specific screwed connection to the sleeve hood or, respectively, sleeve cylinder 1. The studs 18, as pressure-producing elements, thereby have their ends 21 secured captive in the sleeve hood or sleeve cylinder 1 allowing axial movement but not axial rotation. For assembly, the studs 18 are conducted through the discrete parts 11, 24, 35 of the sleeve head and are tightened by screwing on nuts 19. Each of the studs 18 secured against turning thereby compresses a compression spring 20 (coil springs or disc springs) against a guide 22. A resilient pressure dwell or compensator, with which cold flow or volume changes due to temperature influences can be compensated derives as a result of this resilient arrangement (20, 21, 22) in addition to the resilient material (23, 24).

The opposite shading of the seal insert in the figure indicates that a parting of the seal insert has been undertaken in this exemplary embodiment; namely, the seal insert is divided into a central part 23 and an annular part 24. An interface or seam in which the cable introductions 13 are arranged is thereby formed. The outwardly conducted slots such as the slot 14 can be foregone in this way; however, the pressure plates must then also be correspondingly fashioned with an interface or seam 16. Assembly given uncut cables is thus also possible.

Figure 4:
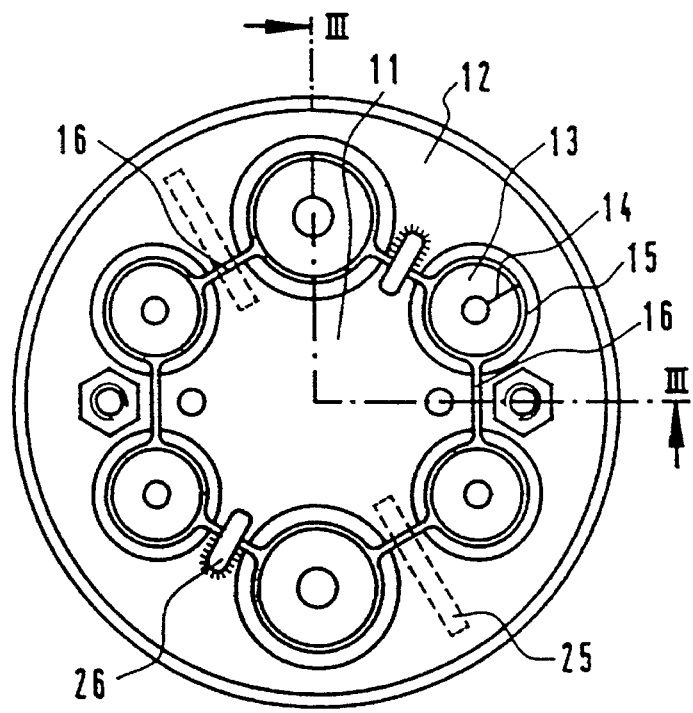
FIG. 4 is a right side view of the annularly divided embodiment.

The resultant shape of the pressure plates can be viewed in FIG. 4. FIG. 3 illustrates the cylindrical range 33 of motion for the outer pressure plate parts 11 and 12. Moreover, a cable clamp device 28 is indicated in the inside of the cable sleeve 1 (only a single cable clamp is shown for the sake of clarity), this cable clamp device 28 aligning with the cable introduction opening 13. This cable clamp device is secured to a central pin 27 to which all other cable clamp devices can also be attached extending radially therefrom, star-like. Each of these cable clamp devices 28 is composed of two clamp legs 30 that embrace the introduced cable and that are pressed together with the tightening strap. It is also shown in this figure that the cable introduction openings of the outer pressure plates 11 or, respectively, 12 are each respectively provided with cylindrical antikink connecting pieces 15. These antikink connecting pieces 15 keep bending loads at the cable away from the seal location. The parting plane 16 between the central part 11 and the annular part 12 of the outer pressure plate may also be seen in this region.

In a right side view, FIG. 4 then shows the conditions of a sleeve head divided by the approximately circular parting plane 16, whereby the central part 11 and the annular part 12 arise as a result thereof. The cable introduction openings 13 are then arranged in this parting plane 16, the cylindrical antikink connecting pieces 15 proceeding around these openings 13. The studs 18 located in the annular part 12 may also be seen. Positioning devices or, respectively, detente elements 26 with which the central part 11 is entrained are applied individually spaced around, or over the entire surface, for a uniform transmission of the compressive pressure from the annular part 12 to the central part 11. Radially directed fixing elements 25 can also be provided for positioning the individual sleeve head elements relative to one another. As indicated, the cable introduction openings 13 located in a one-piece seal insert can also be provided with radially outwardly directed slots 14.

Figure 5:
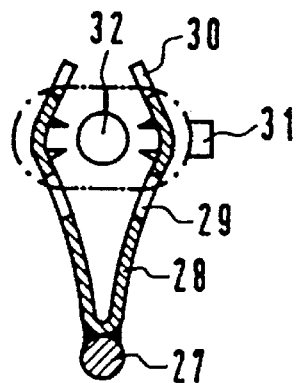
FIG. 5 is a cross sectional view of a cable clamp device.

FIG. 5 conveys the fashioning of the cable clamp device shown in FIG. 3 as being composed of the clamp legs 28 that are secured to the central pin 27. After the introduction of a cable 32, the clamp legs 28 are pressed together by a tightening strap 31 conducted through openings 29 and slots 30.

Figure 6:
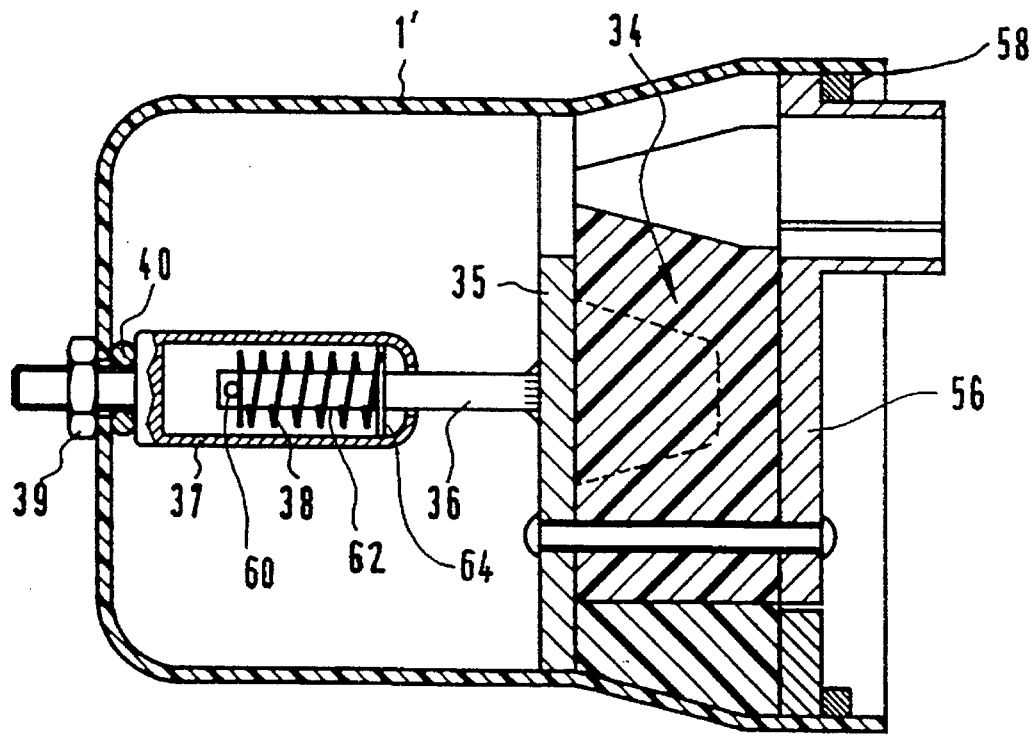
FIG. 6 is a cross sectional view of an exemplary embodiment wherein the pressure-producing elements extend through the entire cable sleeve.

FIG. 6 shows a hood sleeve 1', whereby the pressure-producing element is conducted through a wall of the hood sleeve 1'. The pressure producing element comprises a centrally arranged pin 36 that is secured to an inner pressure plate 35. A spring element 38 within a socket 37 creates a durable pressure dwell or compensation by pressing from a pin anchor 60, fixed to the socket 37, against a flange 64, fixed to the pin 36. The spring 38 is guided by a rod 62. A seal ring 40 creates a required seal in the hood sleeve 1'. After the introduction of the seal 34 and of the two pressure plates 35, 56, the outer pressure plate 56 is fixed in the sleeve 1, for example, with screws or with a fixing ring 58. The pressing power of the spring 38 takes effect after this fixing and the seal is compressed. In such an embodiment, only one spring element is required if the material and the temperature stressing require a pressure dwell means.

Figure 7:
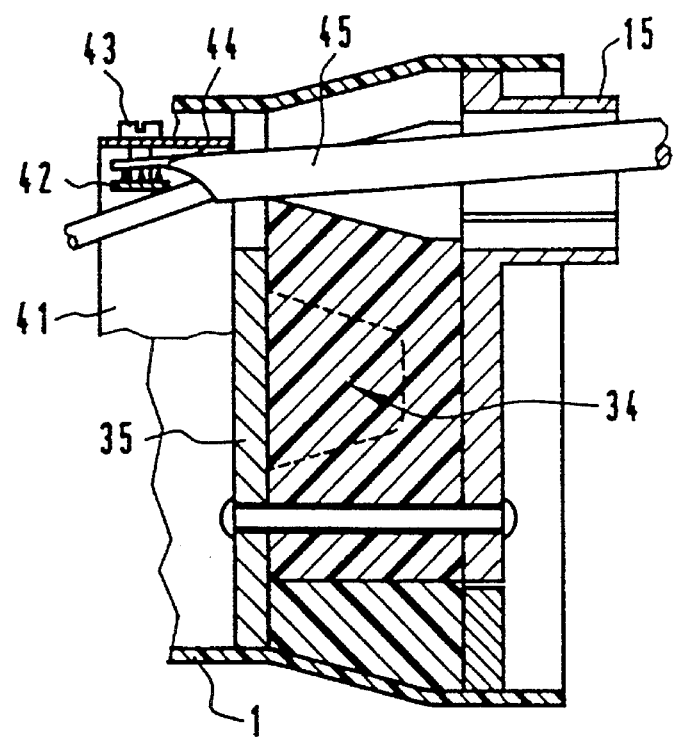
FIG. 7 is a cross sectional view of a cable clamp with shield contacting.

FIG. 7 illustrates a further modification for a cable clamp device in the inside of a cable sleeve 1 having a sleeve head and a seal 34 of the type on which the invention is based. This cable clamp device is secured to the inner pressure plate 35 and is composed of a restraint ring 41 that is arranged in one piece around all cable introduction openings. All cable claddings 45 at which a cable cladding tab 44 has been formed can be clamped to this restraint ring 41 with screws, whereby a contact plate 42 having teeth is arranged at the inside of this cable cladding tab 44. Where the cable cladding is provided with a shielding or is fashioned as a layered cladding, this shielding can be simultaneously contacted with this clamp device. It is also shown here that the cable 45 strikes against the edge of the cylindrical antikink connecting piece 15 given a bending load and that this load is kept away from the seal location as a result thereof.

Figure 8:
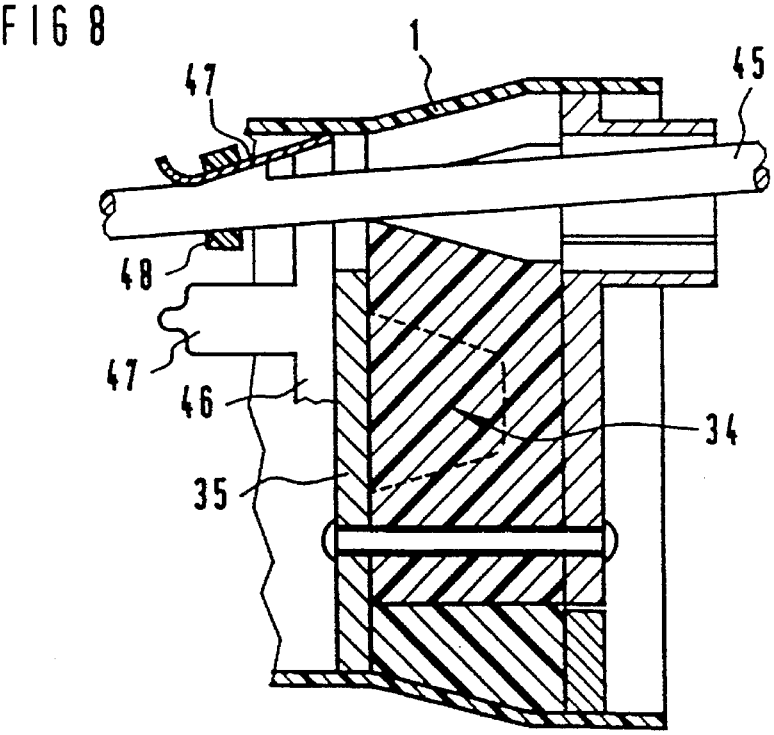
FIG. 8 is a cross sectional view of a simple cable clamp.

FIG. 8 explains a cable clamp device that likewise comprises a shared ring 46 to which a clip 47 is applied at each cable introduction. These clips 47 are bent onto the cable cladding 45 as needed and are clamped fast thereon with tightening straps 48, as the partial section of the figure shows. The other conditions with respect to the sleeve head have already been described.

Figure 9:
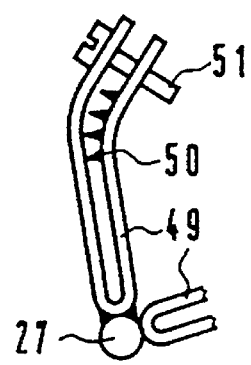
FIG. 9 is a side view of a cable clamp that is to be centrally applied.

FIG. 9 shows another clamp that is formed of two clamp legs 49, whereby these are secured, on the one hand, to a central pin 27 star-like and, on the other hand, are shaped such that, for example, a cable cladding tab can be clamped between their ends with screws 51. Teeth 50 promote the gripping the cladding tab. Only one clamp, or two clamps as shown or more clamps can be attached to the pin 27.

These embodiments can be united or combined in an appropriate way, whereby the fundamental fashioning of the sleeve head in conjunction with the corresponding cable sleeve is preserved in all embodiments.

Although the present invention has been described with reference to a specific embodiment, those of skill in the art will recognize that changes may be made thereto without departing from the scope and spirit of the invention as set forth in the appended claims.

I claim as my invention:

1. In a sleeve head for a cable sleeve having a seal insert of elastic material and having pressure-producing elements for pressing the seal insert, the improvement comprising:

the cable sleeve being conically expanded toward the end in the introduction region;

a conical seal insert, two pressure plates, and at least one pressure-producing element arranged between the two pressure plates, the insert being matched to the introduction region, arranged between the two pressure plates;

the seal insert comprising conically converging cable introduction openings;

the seal insert compressed and shaped by the pressure plates using the pressure-producing elements, such that a sealing pressing against the introduced cables ensues due to the deformation of the seal insert in the cable introduction openings.

2. The improvement according to claim 1, wherein the cable introduction openings are circularly arranged in the seal insert; and wherein radial slots for the introduction of the cables are arranged from the edge of the seal insert to the cable introduction openings.

3. The improvement according to claim 1, wherein the seal insert comprises cavities for material reduction.

4. The improvement according to claim 1, wherein studs are arranged between the pressure plates passing through the seal insert, said studs defining maximum spacing between the pressure plates.

5. The improvement according to claim 1, wherein a thickness of the seal insert is twice as great as the difference between maximum and minimum diameter of the introduced cables.

6. The improvement according to claim 1, wherein at least one screw is provided as the pressure-producing element, said at least one screw being fixed in the inside of the cable sleeve with a detente.

7. The improvement according to claim 6, wherein the pressure producing element comprises a spring arranged between the detente for the pressure-producing element and end of the screw.

8. The improvement according to claim 1, wherein the pressure plates and the seal insert are respectively divided in introduction direction into a central part and into an annular part, wherein the cable introduction openings are arranged in the parting plane therebetween; and mutual positioning elements are arranged between the central part and the annular part.

9. The improvement according to claim 1, wherein the spacing of the cable introduction openings from one another amounts to at least 1.3 times the largest cable diameter to be introduced.

10. The improvement according to claim 1, wherein the compressive pressure on the seal insert amounts, according to the following equation, to:

$$p = \frac{F}{\frac{D1^2 \pi}{4}}$$

11. The improvement according to claim 1, wherein the seal insert central part contains a filling piece with which the elastic characteristic of the seal insert is variable.

12. The improvement according to claim 1, wherein the outer pressure plate comprises respective, cylindrical antikink connecting pieces around the cable introduction openings.

13. The improvement according to claim 1, wherein cable clamp devices are arranged in the inside of the cable sleeve aligning with a plurality of cable introduction openings.

14. The improvement according to claim 13, wherein the cable clamp devices respectively comprise two clamp legs that are secured to a central pin that is arranged at the inner pressure plate.

15. The improvement according to claim 14, wherein the clamp legs can be fixed with a tightening strap embracing the cable after introduction of a cable.

16. The improvement according to claim 14, wherein the clamp legs seize a cable cladding tab in clamping fashion between them.

17. The improvement according to claim 13, wherein each clamp device comprises a restraint ring fixable in the cable sleeve that annularly embraces all cable introduction openings, and a plurality of clamp mechanisms; and in that a plurality of cable claddings can be clamped to the restraint ring with said clamp mechanisms.

18. The improvement according to claim 17, wherein each said clamp mechanism comprises a contact plate having teeth and inserted on the shielding side of the cable cladding and secured to the restraint ring.

19. The improvement according to claim 17, wherein the clamp mechanism comprise projecting clips of said restraint ring; said clips adapted to be fixed to the introduced cables with cable binders.

20. The improvement according to claim 1, wherein a cylindrically proceeding region is provided at the open end of the cable sleeve, having a length sufficient for a required compression stroke of the outer pressure plate producible with the pressure element.

21. The improvement according to claim 1, wherein the pressure element comprises a centrally attaching pressure element that is fashioned as a stud at its end and can be screwed in from the end of the cable sleeve fashioned as a hood sleeve, whereby a seal ring is arranged at the entry opening of the stud.

22. The improvement according to claim 21, wherein the pressure-producing element contains a spring that maintains a pressure dwell.

23. The improvement according to claim 1, wherein the generated lines of the cones of the cable introduction openings and of the seal member insert proceed parallel.

* * * * *